United States Patent
Chiang et al.

[19]

[11] Patent Number: 6,084,908
[45] Date of Patent: *Jul. 4, 2000

[54] APPARATUS AND METHOD FOR QUADTREE BASED VARIABLE BLOCK SIZE MOTION ESTIMATION

[75] Inventors: Tihao Chiang, Plainsboro; Jungwoo Lee, Princeton; Ya-Qin Zhang, Cranbury; Zixiang Xiong, Princeton, all of N.J.

[73] Assignees: Sarnoff Corporation, Princeton, N.J.; Sharp Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/735,869

[22] Filed: Oct. 23, 1996

Related U.S. Application Data

[60] Provisional application No. 60/007,017, Oct. 25, 1995, and provisional application No. 60/020,514, Jun. 28, 1996.

[51] Int. Cl.[7] .............................. H04N 7/12; H04B 1/66
[52] U.S. Cl. ............................................ 375/240; 348/407
[58] Field of Search .................................... 348/405, 406, 348/413, 415, 419, 409, 420, 398, 399, 416; 382/41, 232, 246, 240; 358/533, 454; 375/240; H04B 1/66; H04N 7/12

[56] References Cited

U.S. PATENT DOCUMENTS

| | | | |
|---|---|---|---|
| 4,908,874 | 3/1990 | Gabriel | 382/41 |
| 4,941,193 | 7/1990 | Barnsley et al. | 382/56 |
| 5,216,501 | 6/1993 | Ando | 358/105 |
| 5,396,567 | 3/1995 | Jass | 382/56 |
| 5,412,741 | 5/1995 | Shaprio | 382/232 |
| 5,446,806 | 8/1995 | Ran et al. | 382/240 |
| 5,461,422 | 10/1995 | Hsich | 348/405 |
| 5,515,388 | 5/1996 | Yagasaki | 371/49.1 |
| 5,521,643 | 5/1996 | Yim | 348/405 |
| 5,561,475 | 10/1996 | Jung | 348/699 |
| 5,576,767 | 11/1996 | Lee et al. | 348/413 |
| 5,581,308 | 12/1996 | Lee | 348/699 |
| 5,625,715 | 4/1997 | Trew et al. | 382/236 |
| 5,654,760 | 8/1997 | Ohtsuki | 384/405 |
| 5,691,770 | 11/1997 | Keesman et al. | 348/405 |
| 5,699,119 | 12/1997 | Chunn et al. | 348/405 |
| 5,734,755 | 3/1998 | Ramchandran et al. | 382/250 |
| 5,768,438 | 6/1998 | Etoh | 382/251 |
| 5,778,192 | 7/1998 | Schuster et al. | 395/200.77 |
| 5,790,131 | 8/1998 | Liang et al. | 345/439 |
| 5,825,930 | 10/1998 | Park et al. | 382/232 |

OTHER PUBLICATIONS

Copy of Written Opinion dated Oct. 2, 1997, from corresponding international application PCT/US96/16956.

*Primary Examiner*—Chris S. Kelley
*Assistant Examiner*—Tung Vo
*Attorney, Agent, or Firm*—William J. Burke

[57] ABSTRACT

A method and apparatus for determining an optimal quadtree structure for quadtree-based variable block size (VBS) motion estimation. The method computes the motion vectors for the entire quadtree from the largest block-size to the smallest block-size. Next, the method may optionally select an optimal quantizer scale for each block. The method then compares from "bottom-up" the sum of the distortion from encoding all sub-blocks or sub-nodes (children) as compared to the distortion from encoding the block or node (parent) from which the subnodes are partitioned from. If the sum of the distortion from encoding the children is greater than that of the parent then the node is "merged". Conversely, if the sum of the distortion from encoding the children is less than that of the parent then the node is "split" and the Lagrangian cost for the parent node is set as the sum of the Lagrangian cost of its children. This step is repeated for the all nodes through every level until an optimal quadtree structure is obtained.

17 Claims, 9 Drawing Sheets

APPARATUS AND METHOD FOR QUADTREE BASED VARIABLE BLOCK SIZE MOTION ESTIMATION

This application claims the benefit of U.S. Provisional Applications No. 60/007,017 filed Oct. 25, 1995 and No. 60/020,514 filed Jun. 28, 1996.

The present invention relates to a method and apparatus for encoding video image sequences. More particularly, this invention relates to an apparatus and concomitant method for reducing the computational overhead in determining motion vectors for quadtree-based variable block size motion estimation.

BACKGROUND OF THE INVENTION

The increasing development of digital video technology presents an ever increasing problem of reducing the high cost of video compression codecs (coder/decoder) and resolving the inter-operability of equipment of different manufacturers. To achieve these goals, the Moving Picture Experts Group (MPEG) created the Moving Picture Experts Group (MPEG) created the ISO/IEC international Standards 11172 (1991) (generally referred to as MPEG-1 format) and 13818 (1995) (generally referred to as MPEG-2 format), which are incorporated herein in their entirety by reference. One goal of these standards is to establish a standard coding/decoding strategy with sufficient flexibility to accommodate a plurality of different applications and services such as desktop video publishing, video telephone, video conferencing, digital storage media and television broadcast.

Although the MPEG standards specify a general coding methodology and syntax for generating a MPEG compliant bitstream, many variations are permitted in the values assigned to many of the parameters, thereby supporting a broad range of applications and interoperability. In effect, MPEG does not define a specific algorithm needed to produce a valid bitstream. Furthermore, MPEG encoder designers are accorded great flexibility in developing and implementing their own MPEG-specific algorithms in areas such as image pre-processing, motion estimation, coding mode decisions, scalability, and rate control. This flexibility fosters development and implementation of different MPEG-specific algorithms, thereby resulting in product differentiation in the marketplace. However, a common goal of MPEG encoder designers is to minimize subjective distortion for a prescribed bit rate and operating delay constraint.

In the area of motion estimation, MPEG does not define a specific algorithm for calculating motion vectors for each picture. An image sequence, such as a video image sequence, typically comprises a group of pictures or frames. Each picture may contain up to a megabyte of information. Thus, the transmission and/or storage of such video image sequence requires an enormous amount of storage capacity or transmission bandwidth. To reduce the amount of information that is stored or transmitted, a compression technique known as motion estimation is used to compress the image by removing the redundant information. A motion vector is a two-dimensional vector which is calculated to provide an offset from the coordinate position of a block in the current picture to the coordinates in a reference frame. Because of the high redundancy that exists between the consecutive frames of a video image sequence, a current frame can be reconstructed from a previous reference frame and the difference between the current and previous frames by using the motion information (motion vectors). The use of motion vectors greatly enhances image compression by reducing the amount of information that is transmitted on a channel because only the changes within the current frame are coded and transmitted. Various methods are currently available to an encoder designer for implementing motion estimation.

Generally, motion vectors are calculated for fixed size blocks. That is, the block-matching motion estimation method partitions a picture into a plurality of blocks having a fixed size such as eight (8) pixels by eight (8) pixels and estimates the displacements (motion vectors) for the moving blocks. A motion vector is generated for each block after a search is conducted to "best" match the movement of each block from a previous reference picture. However, large block-sizes generally produce a poor motion estimation, thereby producing a large motion-compensated frame difference (error signal). Conversely, small block-sizes generally produce an excellent motion estimation at the cost of increased computational complexity and the overhead of transmitting the increased number of motion vectors to a receiver. In summary, the bit saving due to a more accurate motion estimation is generally offset by the overhead required for sending the extra motion vectors.

Thus, the balance between high motion-vector overhead and good motion estimation is the focus of a variable block-size motion-estimation method. The goal is to determine what is the optimal block-size for a picture or portion of a picture, e.g., when to apply smaller block-sizes.

FIG. 1 depicts one method of motion estimation where arbitrary variable block-sizes and locations are used to partition a picture. Although the use of arbitrary variable block-sizes may produce a very accurate motion estimation, the computational overhead of transmitting the structure of this partition is very expensive, e.g., the bit cost in describing the location and size for every block is very high.

Furthermore, FIG. 1 illustrates a second problem which is the determination of the optimal block size for a given picture. One method is to conduct an exhaustive search where every available structure is analyzed for a given "depth" or number of allowable block sizes. In a "quadtree" structure (discussed below), it can be shown that the number of searches needed is the same as the number of all possible subtrees, which is given by the inductive relation:

$$C_f(d)=1+(C_f(d-1))^4 \qquad (1)$$

where d is the maximum depth of the tree and $C_f(d)$ is the number of all trees that has the depth less than or equal to d. Approximating equation (1) by $C_f(d) \approx (C_f(d-1))^4$, it can be shown that $C_f(d) \approx 2^{4^{d-1}}$. This suggests that the computation for the exhaustive search for a quadtree having a depth of five (5) is approximately $C_f(d) \approx 8.9*10^{307}$. This computational overhead is impractical for many implementations.

Therefore, a need exists in the art for an apparatus and method for reducing the computational overhead in determining motion vectors for quadtree-based variable block size motion estimation.

SUMMARY OF THE INVENTION

The present invention is a method and apparatus for reducing the computational overhead in determining motion vectors for quadtree-based variable block size (VBS) motion estimation. Namely, an optimal quadtree structure is selected for each picture such that the total distortion for the picture is minimized and the target bit rate for the picture is achieved. Optionally, the current method jointly optimizes the VBS motion estimation and the quantization. The solution to this optimization problem is obtained through the application of the Lagrange multiplier method.

Specifically, the method initially computes the motion vectors of all possible node positions. Namely, it is assumed that the quadtree is fully blossomed, i.e., the entire picture is partitioned spatially down to the lowest level for every node. Thus, the motion vectors for the entire quadtree from the largest block-size to the smallest block-size are calculated. Having calculated the motion vectors, the method proceeds to optimize the quantization for each node. That is, it calculates and compares the distortion of each block for all possible quantizer scales (e.g., from 1–31). The quantizer scale that produces the smallest distortion is selected.

The method then compares from "bottom-up" (the lowest level to the highest level) the sum of the distortion from encoding all sub-blocks or sub-nodes (children) as compared to the distortion from encoding the block or node (parent) from which the subnodes are partitioned from. If the sum of the distortion from encoding the children is greater than that of the parent then the node is "merged". Conversely, if the sum of the distortion from encoding the children is less than that of the parent then the node is "split" and the Lagrangian cost for the parent node is set as the sum of the Lagrangian cost of its children. This step is repeated for the all nodes through every level until an optimal quadtree structure is obtained.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The apparatus and method of the present invention is developed through a Lagrange multiplier approach for solving an optimization problem. The constrained optimization problem is to jointly determine the quadtree structure (discussed below with reference to FIG. 3) and the quantizer scale for each node such that the total distortion D is minimized subject to a total bit budget constraint $R_{budget}$. This problem is expressed as:

$$\min_{S} \min_{Q} D(S, Q) \text{ such that } R(S, Q) \leq R_{budget} \quad (2)$$

where S is the quadtree for VBS motion estimation, Q=Q(S) is the collection of the quantizer scales for all the nodes in the quadtree S, and R is the bit rate corresponding to S and Q.

This problem is converted to a parametrized family of unconstrained minimization problem by introducing the Lagrangian cost $L(S,Q)=D(S,Q)+\lambda R(S,Q)$ corresponding to the Lagrange multiplier $\lambda \geq 0$. The problem is expressed as:

$$\min_{S} \min_{Q} [D(S, Q) + \lambda R(S, Q)] \quad (3)$$

Thus, a solution (S*, Q*) for equation (3) is also a solution to equation (2) for the particular case of $R_{budget}=R(S^*, Q^*)$. Furthermore, once the solution to the unconstrained problem in equation (3) with $\lambda^*$ that makes $R(S^*, Q^*)$ equal to $R_{budget}$ is obtained, then (S*, Q*) also solves the constrained problem in equation (2). Since there is a monotonic relationship (inversely proportional) between $\lambda$ and R(S,Q), a $\lambda$ that equals to $\lambda^*$ is obtained by sweeping from 0 to $\infty$ (discussed below with reference to FIG. 5).

Finally, the Lagrangian cost in equation (3) is decomposed into quadtree optimization and quantizer scale optimization. Denote a node of a subtree S by n and the collection of all n belonging to S by $A_S$. The cost is then expressed as the sum of the cost at each node:

$$L(S, Q) = \sum_{n \in A_S} L_n \quad (4)$$

$$= \sum_{n \in A_S} (D(n, q(n)) + \lambda R(n, q(n)))$$

where $L_n$ is the Lagrangian cost for the node n and q(n) is the quantizer scale for the node. With the above decomposition, the joint minimization problem in equation (3) becomes two independent minimization problem; one for S and the other for Q:

$$\min_{S} \sum_{n \in A_S} [\min_{q \in A_Q} L_n] \quad (5)$$

where $A_Q$ is the collection of all allowable quantizer scales. To solve for equation (5), the first step is to solve for the best quantizer scale for all the nodes in the full quadtree. The next step is to determine the best subtree S that minimizes the node Lagrangian cost. A detailed discussion of the solution to the problem in equation (5) is disclosed with reference to FIGS. 2 and 5 below.

Figure 2:
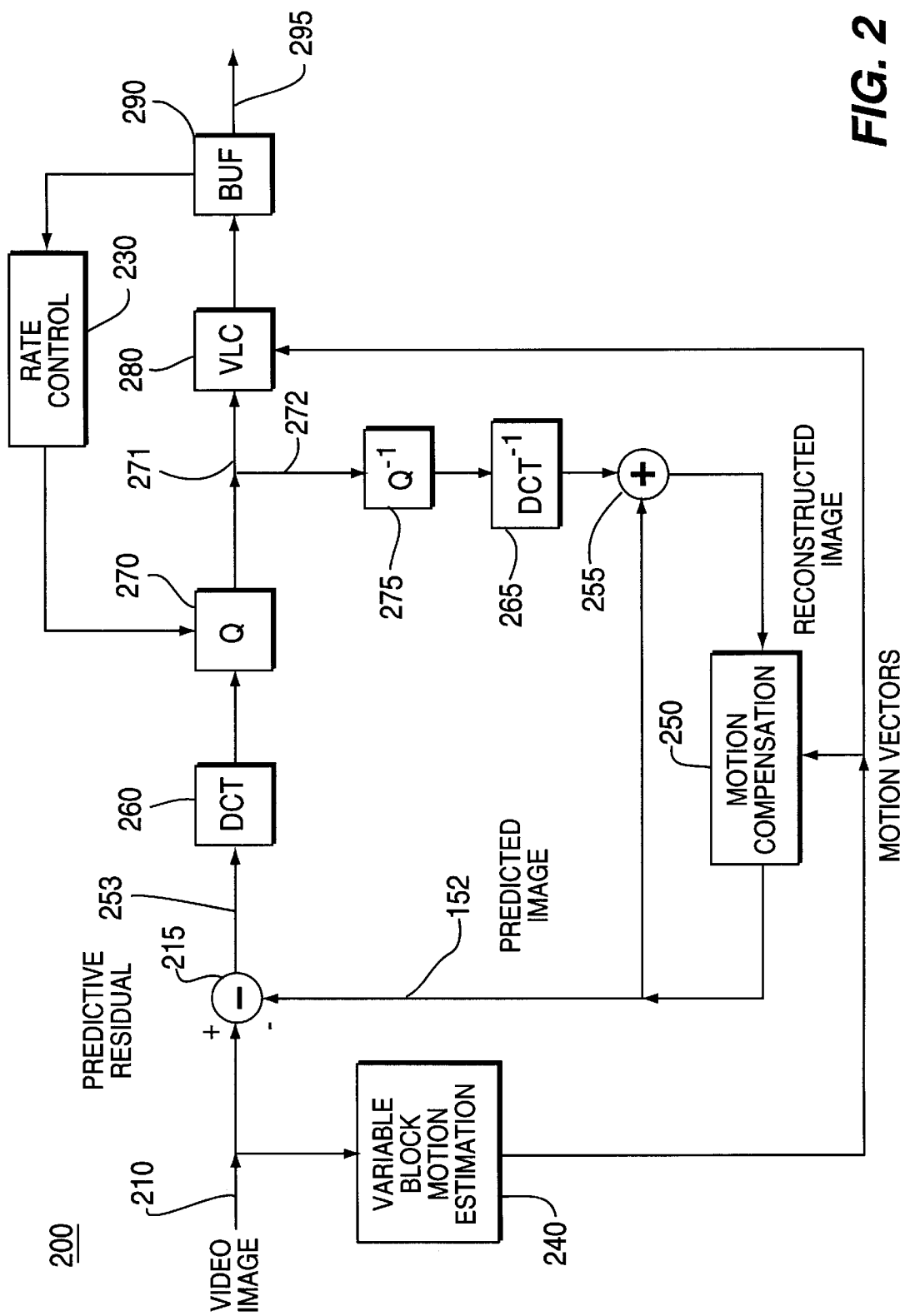
FIG. 2 illustrates a block diagram of the apparatus of the present invention.

FIG. 2 depicts a block diagram of the apparatus 200 of the present invention for reducing the computational overhead in determining motion vectors for quadtree-based variable block size motion estimation. In the preferred embodiment of the present invention, the apparatus 200 is an encoder or a portion of a more complex variable block-based motion compensation coding system. The apparatus 200 comprises a variable block motion estimation module 240, a motion compensation module 250, a rate control module 230, a discrete cosine transform (DCT) module 260, a quantization (Q) module 270, a variable length coding (VLC) module 280, a buffer (BUF) 290, an inverse quantization ($Q^{-1}$) module 275, an inverse DCT ($DCT^{-1}$) transform module 265, a subtractor 215 and a summer 255. Although the apparatus 200 comprises a plurality of modules, those skilled in the art will realize that the functions performed by the various modules are not required to be isolated into separate modules as shown in FIG. 2. For example, the set of modules comprising the motion compensation module 250, inverse quantization module 275 and inverse DCT module 265 is generally known as an "embedded decoder".

FIG. 2 illustrates an input video image (image sequence) on path 210 which is digitized and represented as a luminance and two color difference signals (Y, $C_r$, $C_b$) in accordance with the MPEG standards. These signals are further divided into a plurality of layers (sequence, group of pictures, picture, slice and blocks) such that each picture (frame) is represented by a plurality of blocks having different sizes. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format. In the preferred embodiment, the permissible block-sizes and their locations are dictated by the structure of a quadtree as illustrated in FIG. 3.

Figure 3:
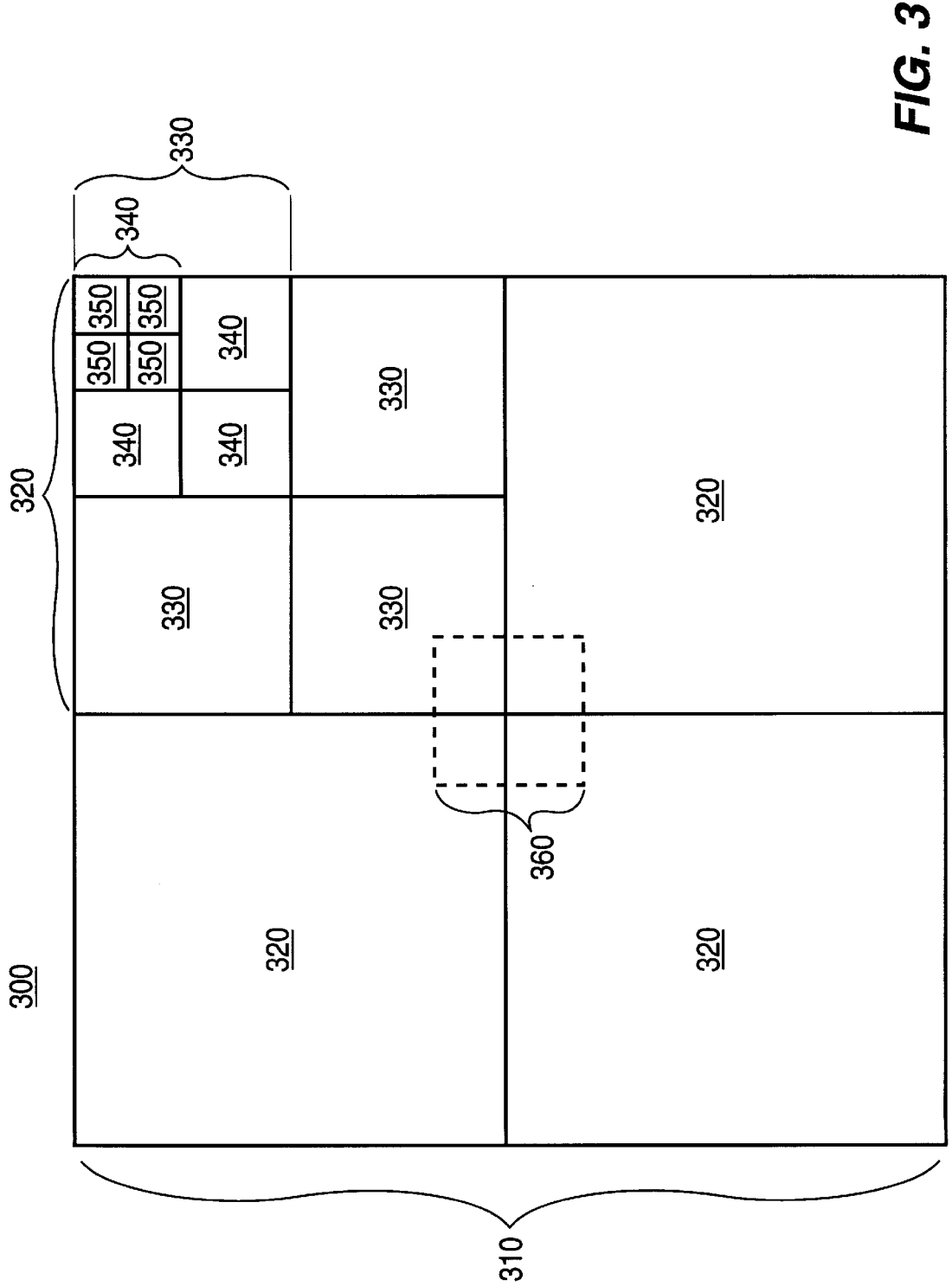
FIG. 3 illustrates a block diagram of a quadtree structure.

FIG. 3 depicts the concept of a quadtree structure having five (5) levels. Although the quadtree structure permits blocks of variable sizes, it limits those block-sizes and their locations to a predefined structure.

To illustrate, the quadtree structure starts from an initial level "0" comprising a single block 310 of the entire picture. Specifically, the initial block can be a 256 by 256 block where any input picture of greater size will be cropped to this block-size. If the quadtree structure is further partitioned into a second level "1", then the initial block is subdivided into four (4) blocks 320. Again, if further partitioning is required of block 320, each block 320 can be subdivided into four (4) blocks 330 which, in turn, can be subdivided into blocks 340 and subblocks 350 and so on. In the preferred embodiment, the set of allowable block-sizes is {8, 16, 32, 64, 128, 256}. In other words, a quadtree with six layers is selected. However, those skilled in the art will realize that the present invention can be modified by employing other tree structures and/or with a different number of layers. For example, the quadtree can be implemented as a "sixteen-tree", where each block is divided into sixteen blocks in the next level.

The quadtree structure provides an efficient method of assigning increasingly smaller blocks to areas of a picture where there are significant displacements (motion information) that require greater motion estimation. For example, the quadtree structure of FIG. 3 may be appropriate for a picture that possesses displacements in the upper right hand "split" block 320. Information in the other "merged" blocks 320 may contain no displacement as compared from a reference picture such that it can be encoded with motion vectors for a larger block-size without the penalty of introducing greater distortion.

Figure 1:
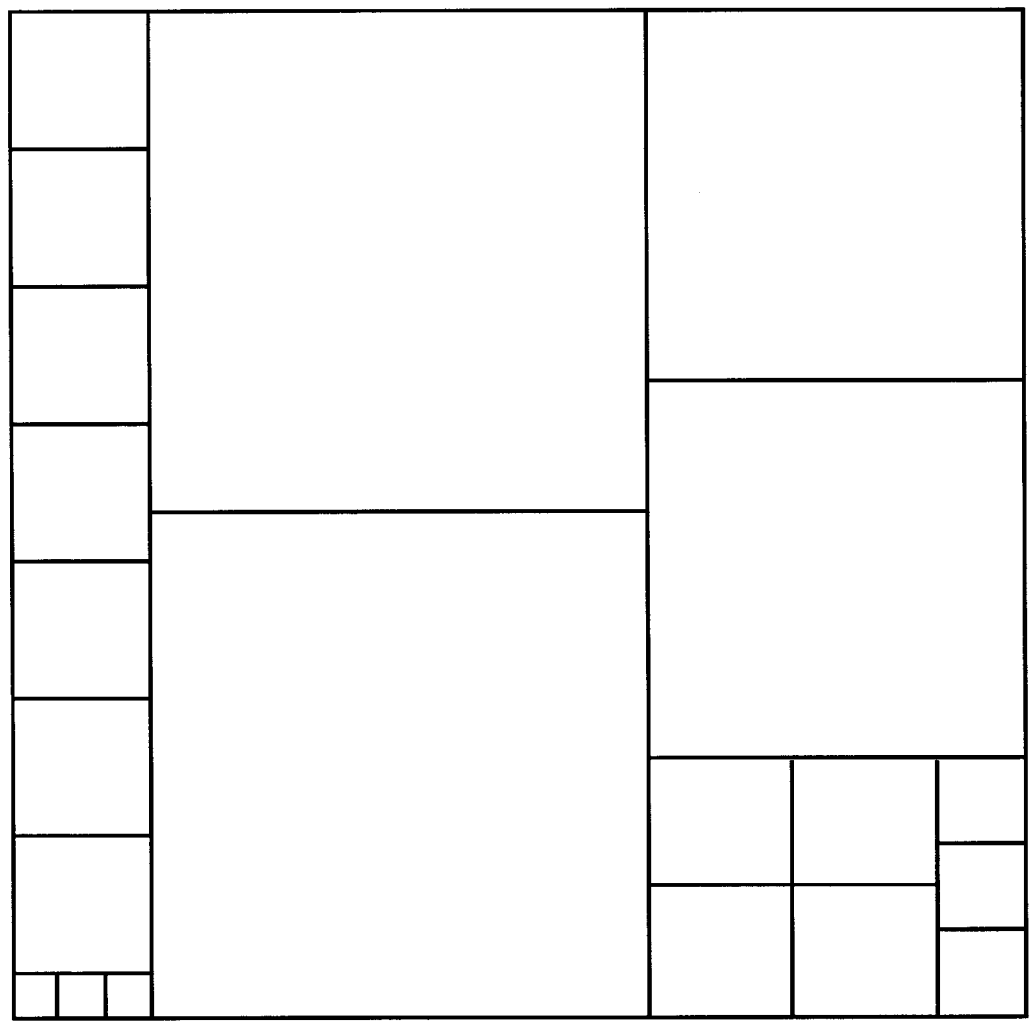
FIG. 1 illustrates a block diagram of motion estimation where arbitrary variable block-sizes and locations are used to partition a picture.

Thus, the quadtree structure does not permit arbitrary block-size and location as illustrated by block 360 (in dashed lines) or the blocks of FIG. 1. This limitation simplifies the information that is sent to a receiver (not shown) for describing the quadtree structure. For example, the quadtree structure of FIG. 3 can be efficiently described by thirteen (13) data bits e.g., 1,0100,0100,0100 (commas are not part of the data set). Generally, this set of data bits can be interpreted at the receiver as describing a quadtree structure where the second block at every level is split. However, those skilled in the art will realize that various methods of using data bits to describe a quadtree structure can be employed, e.g., using shortened bit patterns to represent frequently used quadtree structures and the like. Without the use of the quadtree structure, it would require hundreds of bits to describe the number of blocks, their sizes and their locations to a receiver for every picture. Thus, the limitation in variability of block-sizes and their locations of a quadtree, is offset by the substantial bit saving in transmitting its structure.

Returning to FIG. 2, the input video image on path 210 is received into variable block motion estimation module 240 for estimating motion vectors. Specifically, the variable block motion estimation module 240 computes the motion vectors of all possible node positions for the entire picture. Namely, it is assumed that the quadtree is fully blossomed, i.e., the entire picture is partitioned spatially down to the lowest level for every node. Thus, the motion vectors for the entire quadtree from the largest block-size to the smallest block-size are calculated.

The motion vectors from the variable block motion estimation module 240 are received by the motion compensation module 250 for improving the efficiency of the prediction of sample values. Motion compensation involves a prediction that uses motion vectors to provide offsets into the past and/or future reference frames containing previously decoded sample values that are used to form the prediction error. Namely, the motion compensation module 250 uses the previously decoded frame and the motion vectors to construct an estimate of the current frame.

Furthermore, prior to performing motion compensation prediction for a given block, a coding mode must be selected. In the area of coding mode decision, MPEG provides a plurality of different coding modes. Generally, these coding modes are grouped into two broad classifications, inter mode coding and intra mode coding. Intra mode coding involves the coding of a block or picture that uses information only from that block or picture. Conversely, inter mode coding involves the coding of a block or picture that uses information both from itself and from blocks and pictures occurring at different times. Specifically, MPEG-2 provides coding modes which include intra mode, no motion compensation mode (No MC), frame/field/dual-prime motion compensation inter mode, forward/backward/average inter mode and field/frame DCT mode. The proper selection of a coding mode for each block will improve coding performance. Again, various methods are currently available to an encoder designer for implementing coding mode decision.

Once a coding mode is selected, motion compensation module 250 generates a motion compensated prediction (predicted image) on path 252 of the contents of the block based on past and/or future reference pictures. This motion compensated prediction on path 252 is subtracted via subtractor 215 from the video image on path 210 in the current block to form an error signal or predictive residual signal on path 253. The formation of the predictive residual signal effectively removes redundant information in the input video image. Namely, instead of transmitting the actual video image via a transmission channel, only the information necessary to generate the predictions of the video image and the errors of these predictions are transmitted, thereby significantly reducing the amount of data needed to be transmitted. To further reduce the bit rate, predictive residual signal on path 253 is passed to the DCT module 260 for encoding.

The DCT module 260 then applies a forward discrete cosine transform process to each block of the predictive residual signal to produce a set of eight (8) by eight (8) blocks of DCT coefficients. The number of 8×8 blocks of DCT coefficients will depend upon the size of each block. The discrete cosine transform is an invertible, discrete orthogonal transformation where the DCT coefficients represent the amplitudes of a set of cosine basis functions. One advantage of the discrete cosine transform is that the DCT coefficients are uncorrelated. This decorrelation of the DCT coefficients is important for compression, because each coefficient can be treated independently without the loss of compression efficiency. Furthermore, the DCT basis function or subband decomposition permits effective use of psychovisual criteria which is important for the next step of quantization.

The resulting 8×8 block of DCT coefficients is received by quantization module 270 where the DCT coefficients are quantized. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

However, subjective perception of quantization error greatly varies with the frequency and it is advantageous to use coarser quantization values for the higher frequencies. Namely, human perceptual sensitivity of quantization errors are lower for the higher spatial frequencies. As a result, high frequencies are quantized more coarsely with fewer allowed values than low frequencies. Furthermore, an exact quantization matrix depends on many external parameters such as the characteristics of the intended display, the viewing distance and the amount of noise in the source. Thus, it is possible to tailor a particular quantization matrix for an application or even for an individual sequence of frames. Generally, a customized quantization matrix can be stored as context together with the compressed video image. The proper selection of a quantizer scale is performed by the rate control module 230 and is described below with reference to FIG. 5.

Next, the resulting 8×8 block of quantized DCT coefficients is received by variable length coding module 280 via signal connection 271, where the two-dimensional block of quantized coefficients is scanned in a "zig-zag" order to convert it into a one-dimensional string of quantized DCT coefficients. This zig-zag scanning order is an approximate sequential ordering of the DCT coefficients from the lowest spatial frequency to the highest. Since quantization generally reduces DCT coefficients of high spatial frequencies to zero, the one-dimensional string of quantized DCT coefficients is typically represented by several integers followed by a string of zeros.

Variable length coding (VLC) module 280 then encodes the string of quantized DCT coefficients and all side-information for the block such as block type and motion vectors. The VLC module 280 utilizes variable length coding and run-length coding to efficiently improve coding efficiency. Variable length coding is a reversible coding process where shorter code-words are assigned to frequent events and longer code-words are assigned to less frequent events, while run-length coding increases coding efficiency by encoding a run of symbols with a single symbol. These coding schemes are well known in the art and are often referred to as Huffman coding when integer-length code words are used. Thus, the VLC module 280 performs the final step of converting the input video image into a valid data stream.

The data stream is received into a "First In-First Out" (FIFO) buffer 290. A consequence of using different picture types and variable length coding is that the overall bit rate into the FIFO is variable. Namely, the number of bits used to code each frame can be different. In applications that involve a fixed-rate channel, a FIFO buffer is used to match the encoder output to the channel for smoothing the bit rate. Thus, the output signal of FIFO buffer 290 is a compressed representation of the input video image 210, where it is sent to a storage medium or telecommunication channel on path 295.

The rate control module 230 serves to monitor and adjust the bit rate of the data stream entering the FIFO buffer 290 for preventing overflow and underflow on the decoder side (within a receiver or target storage device, not shown) after transmission of the data stream. A fixed-rate channel is assumed to put bits at a constant rate into an input buffer within the decoder. At regular intervals determined by the picture rate, the decoder instantaneously removes all the bits for the next picture from its input buffer. If there are too few bits in the input buffer, i.e., all the bits for the next picture have not been received, then the input buffer underflows resulting in an error. Similarly, if there are too many bits in the input buffer, i.e., the capacity of the input buffer is exceeded between picture starts, then the input buffer overflows resulting in an overflow error. Thus, it is the task of the rate control module 230 to monitor the status of buffer 290 to control the number of bits generated by the encoder, thereby preventing the overflow and underflow conditions. Rate control algorithms play an important role in affecting image quality and compression efficiency.

Currently, one way of controlling the bit rate is to alter the quantization process, which will affect the distortion of the input image. By altering the quantizer scale (step size), the bit rate can be changed and controlled. To illustrate, if the buffer is heading toward overflow, the quantizer scale should be increased. This action causes the quantization process to reduce additional DCT coefficients to the value of "zero", thereby reducing the number of bits necessary to code a block. This, in effect, reduces the bit rate and should resolve a potential overflow condition.

Conversely, if the buffer is heading toward underflow, the quantizer scale should be decreased. This action produces the effect of increasing the number of non-zero quantized DCT coefficients, thereby increasing the number of bits necessary to code a block. Thus, the increase in bit rate should resolve a potential underflow condition.

In the preferred embodiment of the present invention, rate control module 230 selects a quantizer scale for each block by calculating the minimum Lagrangian costs of all the nodes in the complete tree by finding the best quantizer scale for each node. Namely, each block is encoded with the entire set of quantizer scales (1–31) and the quantizer scale that produces the minimum Lagrangian cost is selected for that block. Those skilled in the art will realize that quantizer scales of different values can be used. A detailed description of the method for the joint optimization of the quadtree structure and quantizer scale is discussed below with reference to FIG. 5.

The resulting 8×8 block of quantized DCT coefficients from the quantization module 270 is also received by the inverse quantization module 275 via signal connection 272. At this stage, the encoder 200 regenerates I-frames and P-frames of the input video image by decoding the data so that they are used as reference frames for subsequent encoding. The inverse quantization module 275 starts the decoding process by dequantizing the quantized DCT coefficients. Namely, the quantized DCT coefficients are multiplied by a set of quantization values with appropriate rounding to produce integer values.

The resulting dequantized 8×8 block of DCT coefficients are passed to the inverse DCT module 265 where inverse DCT is applied to each block to produce the decoded error signal. This error signal is added back to the prediction signal from the motion compensation module via summer 255 to produce a decoded reference picture (reconstructed image). Generally, if an I-frame or a P-frame is decoded, it will be stored, replacing the oldest stored reference.

To select the proper quadtree structure, apparatus 200 compares from "bottom-up" (the lowest level to the highest level) the sum of the distortion from encoding all sub-blocks or sub-nodes (children) as compared to the distortion from encoding the block or node (parent) from which the subnodes are partitioned from. Namely, a parent node is split or merged by comparing the Lagrangian cost of the parent node with that of its children nodes. If the sum of the distortion from encoding the children is greater than that of the parent then the node is "merged". Conversely, if the sum of the distortion from encoding the children is less than that of the parent then the node is "split" and the Lagrangian cost for the parent node is set as the sum of the Lagrangian cost of its children. This step is repeated for the all nodes through every level until an optimal quadtree structure is obtained.

Figure 4:
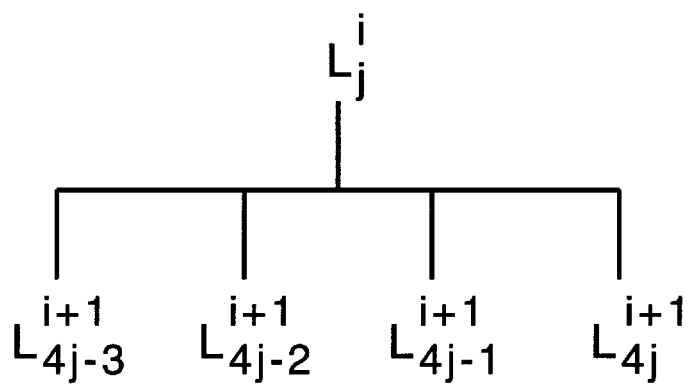
FIG. 4 illustrates the relationship between the Lagrangian costs of a parent node and its children nodes.

To illustrate the above pruning method, FIG. 4 depicts a parent node at the j-th position of the i-th level and denote its Lagrangian cost by $L_j^i$. The Lagrangian costs of its children nodes are then denoted by $L_{4j-3}^{i+1}$, $L_{4j-2}^{i+1}$, $L_{4j-1}^{i+1}$, and $L_{4j}^{i+1}$. If $L_j^i \leq L_{4j-3}^{i+1}+L_{4j-2}^{i+1}+L_{4j-1}^{i+1}+L_{4j}^{i+1}$, then the node is merged. Otherwise, the node is split.

This method significantly reduces the computational overhead as compared to the exhaustive search method of equation (1). The complexity of this tree pruning method is proportional to the number of the Lagrangian cost comparisons. This number is identical to the number of all the nodes of a quadtree except those in the bottom level (level d). Thus, the complexity is expressed as:

$$C_p(d) = \sum_{k=0}^{d-1} 4^k = \frac{1}{3}(4^d - 1) \qquad (6)$$

For d=5, the complexity $C_p(5)$ is 341. Thus, the current method produces a very significant saving of approximately $10^{305}$ folds when compared to the exhaustive search method.

Furthermore, this method produces an optimal solution because it starts from a complete blossomed tree and, thus, avoids local minima associated with growing a tree from the top to the bottom, i.e., a "top-down" comparison (search pattern).

Figure 5:
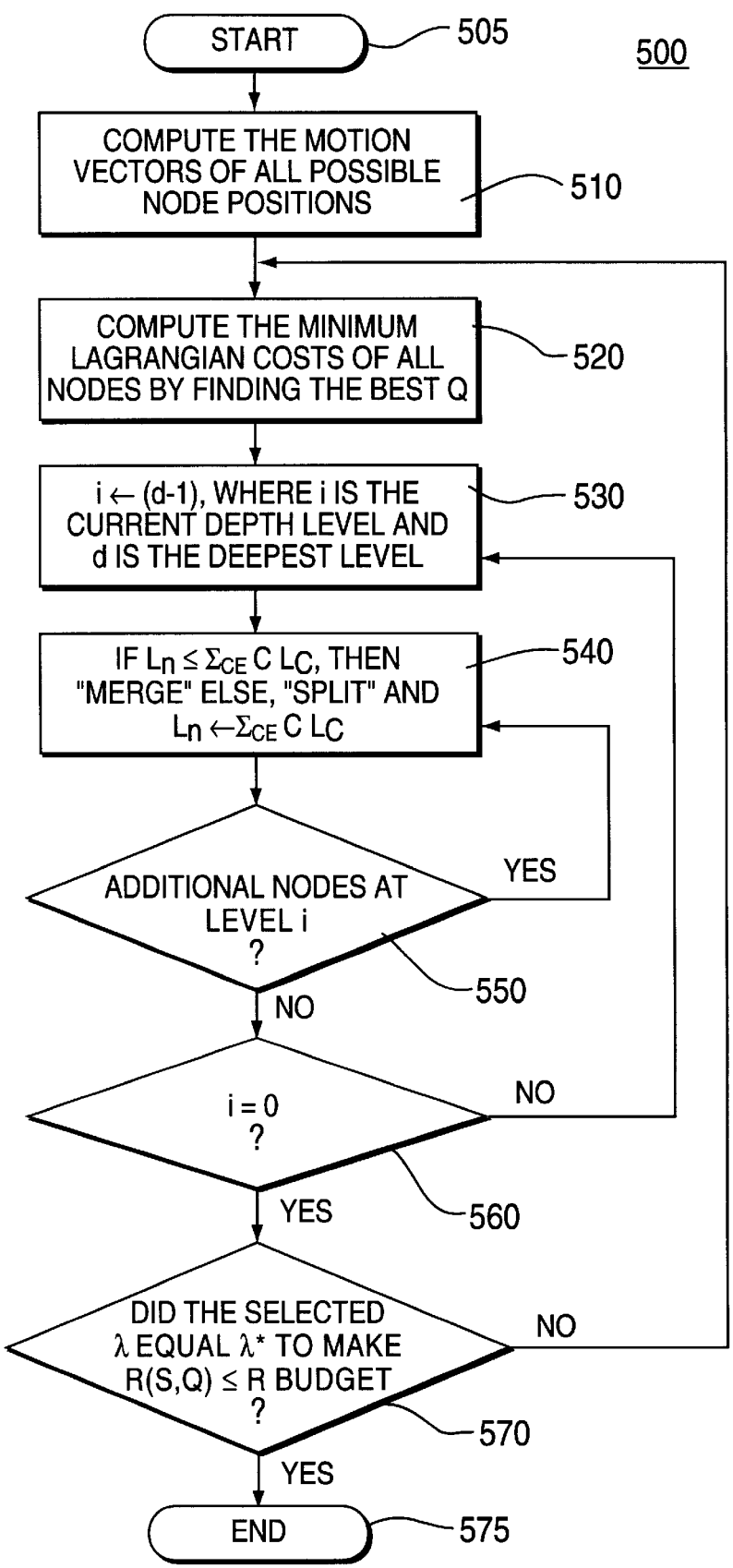
FIG. 5 illustrates a flowchart for the joint optimization of the quadtree structure and quantizer scale.

FIG. 5 depicts a flowchart for the joint optimization of the quadtree structure and quantizer scale in the preferred embodiment of the present invention. The method 500 is formulated to derive an optimal quadtree structure with an optimal quantizer scale for each block of the quadtree structure. The solution satisfies the budget bit rate allocated to the picture while minimizing the total distortion of the encoded picture.

Referring to FIG. 5, the method begins at step 505 and proceeds to step 510 where the method computes the motion vectors of all possible node positions. The method assumes that the quadtree is fully blossomed, i.e., the entire picture is partitioned spatially down to the lowest level for every node. Thus, the motion vectors for the entire quadtree from the largest block-size to the smallest block-size are calculated. The motion vectors for all blocks are passed to step 520 to calculate for an appropriate quantizer scale.

In step 520, the method proceeds to optimize the quantization for each node. The method calculates and compares the distortion of each block for all possible quantizer scales (e.g., from 1–31). Namely, each block is encoded with the entire set of quantizer scales from 1 to 31 and the quantizer scale that produces the minimum Lagrangian cost is selected for that block.

In step 530, the method sets i equal to d−1, where i is the current depth level and d is the deepest level. The method effectively begins the search for the optimal quadtree from the bottom-up.

In step 540, the method then compares from the lowest level to the highest level, the Lagrangian cost $L_n$ of the current parent node n with the sum of the Lagrangian cost $L_c$ of its children nodes c. In effect, the method compares the sum of the distortion from encoding all sub-blocks or sub-nodes (children) as compared to the distortion from encoding the block or node (parent) from which the subnodes are partitioned from. If the sum of the distortion (Lagrangian cost) from encoding the children is greater than that of the parent, then the node is "merged". Conversely, if the sum of the distortion (Lagrangian cost) from encoding the children is less than that of the parent, then the node is "split" and $L_n$ for the parent node is set as the sum of the $L_c$ of its children. The effect of $L_n \leftarrow \Sigma L_c$ is to eliminate the problem of local minima. This fast pruning technique significantly reduces the computational complexity of determining the optimal quadtree structure such that method 500 can be implemented in real-time in an appropriate hardware.

In step 550, method 500 queries whether there are additional nodes that remain in the current level. If the query is affirmatively answered, method 500 returns to step 540 to determine whether to prune the next node. If the query is negatively answered, method 500 proceeds to step 560.

In step 560, method 500 queries whether the method has reached the highest level or root of the quadtree structure. If the query is negatively answered, method 500 returns to step 530 and the steps of 540 and 550 are repeated until the next level is pruned. If the query is negatively answered, method 500 proceeds to step 570.

In step 570, method 500 queries whether the selected $\lambda$ is equal to the $\lambda^*$ that makes $R(S^*, Q^*)$ equal to $R_{budget}$. In the present invention, the Lagrange multiplier is assumed to be fixed. However, the multiplier $\lambda$ can be calculated iteratively by sweeping $\lambda$ over the range zero to infinity. Namely, during the sweep, a set of solutions $S^*$, $Q^*$ and $R^*$ ($\lambda$) is obtained such that one value of $R^*$ ($\lambda$) will be equal to $R_{budget}$. Since $R(\lambda)$ is a monotonically decreasing function, a binary search is used to calculate a desired $\lambda$ that minimizes the distortion for a prescribed bit budget constraint. For example, $\lambda^*$ can be selected from the relationship:

$$\lambda^* = \frac{|D_2(\lambda_2) - D_1(\lambda_1)|}{|R_1(\lambda_1) - R_2(\lambda_2)|} \quad (7)$$

where the sets of ($R_1$ and $D_1$) and ($R_2$ are $D_2$) are the bit rate and distortion for two arbitrarily selected $\lambda_1$ and $\lambda_2$ respectively. Generally, $\lambda_1$ is set at a low value such as 0, while $\lambda_2$ is set at a high value such as 1,000,000. The $\lambda^*$ calculated from equation (7) is used to see whether it is the appropriate value to cause $R^*$ ($\lambda$) equal to $R_{budget}$. If $\lambda$ is not the appropriate $\lambda$, then it is used in equation (7) to replace $\lambda_1$ or $\lambda_2$ for calculating a new $\lambda^*$. This iterative process is continued until $R^*$ ($\lambda$) is less than or equal to $R_{budget}$. Generally, $\lambda^*$ can be obtained within ten (10) iterations.

However, those skilled in the art will realize that many binary search techniques exist and the current method is not limited to equation (7). For a detailed description of such algorithms, see Yair Shoham and Allen Gersho, Efficient Bit Allocation for an Arbitrary Set of Quantizers, IEEE Transactions on Acoustics, Speech, and Signal Processing, Vol. 36, No. 9, (September 1988).

Thus, if method 500 determines in step 570 that the selected $\lambda$ is not equal to the $\lambda^*$ that makes $R(S^*, Q^*)$ equal to $R_{budget}$, then the method returns to step 520 and repeat the method using a different $\lambda$ in accordance with equation (7). If the query is positively answered, method 500 proceeds to step 575 where the method ends or the method is repeated for the next picture.

However, to further reduce the complexity of the current invention, a number of steps can be eliminated to simplify the method. One simplification is to eliminate step 570 of FIG. 5 by using the Lagrange multiplier of the previous picture as that of the current picture. A second simplification is to adopt an identical quantizer scale for all nodes of a given subtree or for the entire quadtree S.

Finally, a third simplification is to use a greedy algorithm for a quadtree search. Instead of pruning out a complete quadtree to obtain a desired structure, a quadtree can be grown greedily from the top to the bottom using the same rule of Lagrangian cost comparison as in the above tree pruning algorithm. In this greedy approach, it is not necessary to generate the rate-distortion data for all possible nodes. Only the data for the nodes of the tree being grown needs to be computed. However, the solution obtained from this approach may not be optimal due to the problem of local minima.

A simulation on a Salesman sequence was conducted to compare the performance of the optimal VBS motion estimation and that of a conventional motion estimation with 16×16 fixed block size (FBS). For comparison purposes, the same quantizer scale optimization routine and residual coder are used for both cases. Furthermore, only the luminance (Y) is encoded and only forward motion compensation is used to reduce the encoding delay. The simulation cropped the 120 frames of the Salesman sequence into the 256×256 size and the frame rates were 10 frames/sec. for the bit rate 64 kb/sec.

Figure 6:
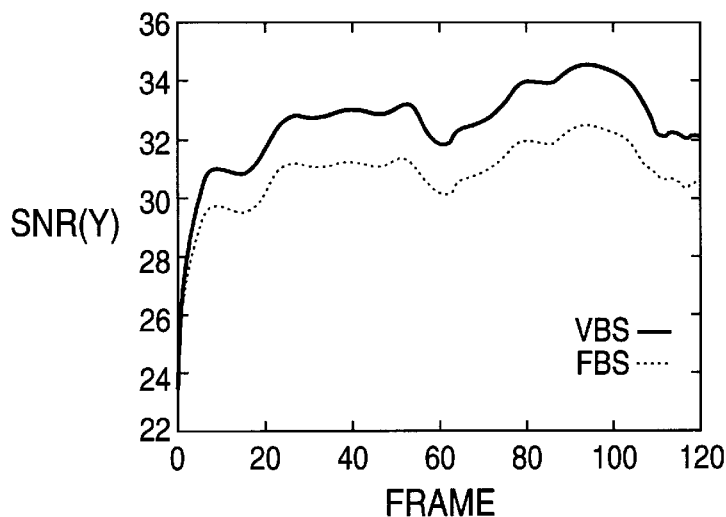
FIG. 6 illustrates a SNR comparisons between VBS motion estimation and FBS motion estimation.
Figure 7:
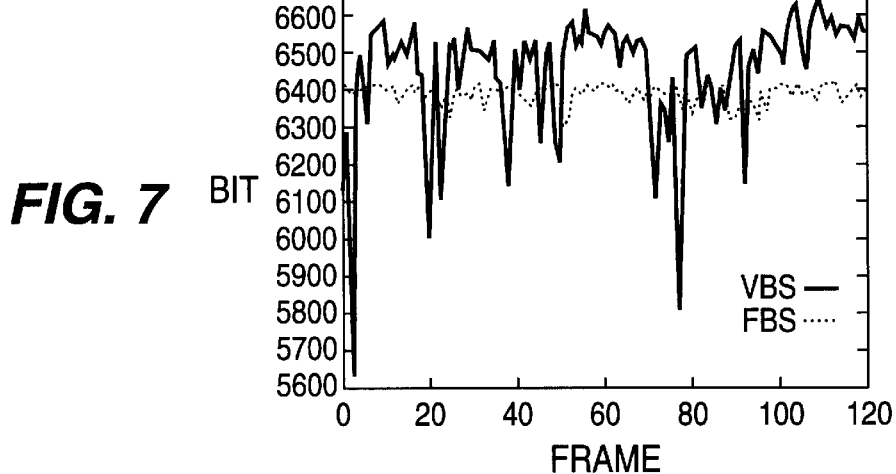
FIG. 7 illustrates a bit rate comparisons between VBS motion estimation and FBS motion estimation.

FIG. 6 and FIG. 7 show SNR and bit rate results at 64 kb/sec. for the Salesman sequence. The VBS motion estimation method improves on the FBS method by 1.7 dB. The average SNR's for the VBS and the FBS method are 32.54 dB and 30.84 dB respectively.

Figure 9:
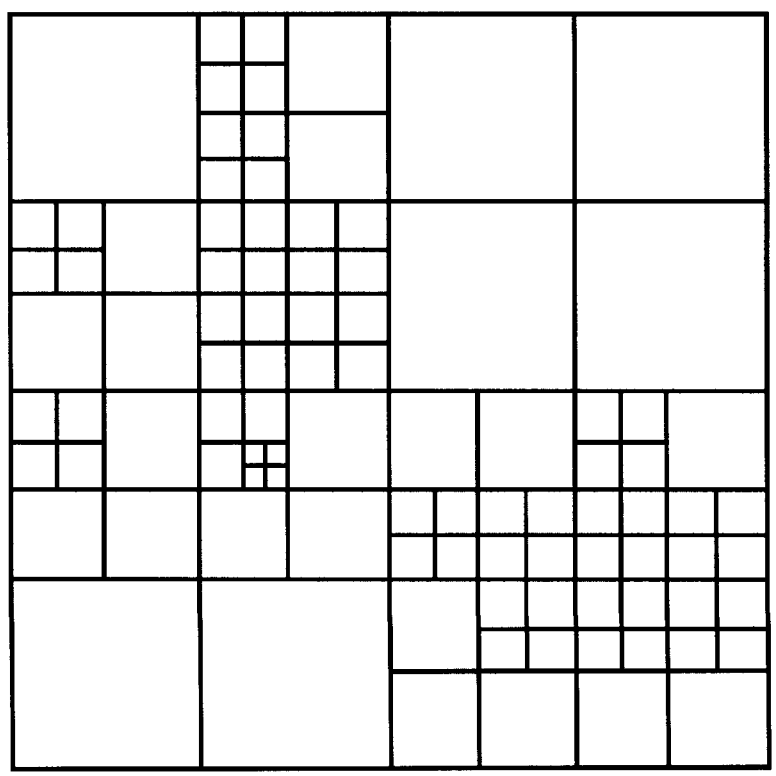
FIG. 9 illustrates the quadtree structure used for frame 60 in the VBS motion estimation of the Salesman sequence.
Figure 8:
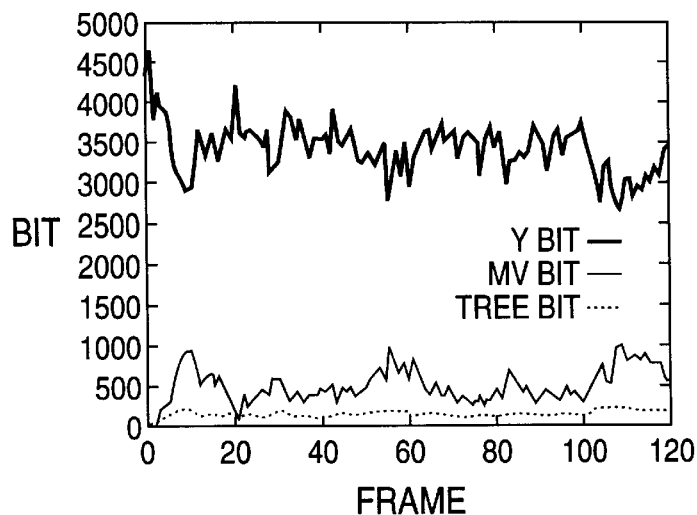
FIG. 8 illustrates the luminance bit, motion vector bit and quadtree bit results for VBS motion estimation.

FIG. 8 shows the bit rate curves of the luminance data, the motion vectors, and the quadtree representation. FIG. 9 shows the optimal quadtree which was used by the VBS method for the frame 60 of the Salesman sequence.

In a second preferred embodiment, the above method is adapted to a Wavelet based scheme. Wavelet based compression is a compression technique that appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer incorporating zerotrees. The representation of signal data using a multiresolution hierarchical subband representation was disclosed by Burt et al. in IEEE Trans. on Commun., Vol Com-31, No. 4, April 1983, page 533. A wavelet pyramid, also known as critically sampled quadrature-mirror filter (QMF) subband representation, is a specific type of multiresolution hierarchical subband representation of an image. A wavelet pyramid was disclosed by Pentland et al. in Proc. Data Compression Conference Apr. 8–11, 1991, Snowbird, Utah. A QMF subband pyramid has been described in "Subband Image Coding", J. W. Woods ed., Kluwer Academic Publishers, 1991 and I. Daubechies, Ten Lectures on Wavelets, Society for Industrial and Applied Mathematics (SIAM): Philadelphia, Pa., 1992. Additionally, an inter-frame wavelet video compression scheme is disclosed in U.S. Pat. No. 5,495,292, issued Feb. 27, 1996 for motion video decoding.

Furthermore, the Wavelet based compression technique is disclosed in U.S. Pat. No. 5,412,741, issued May 2, 1995 and herein incorporated by reference, which describes using the discrete wavelet transform (DWT) in deriving embedded zerotree wavelets (EZW) to form an hierarchical image representation. This hierarchical representation is then efficiently coded using entropy coding.

Figure 10:
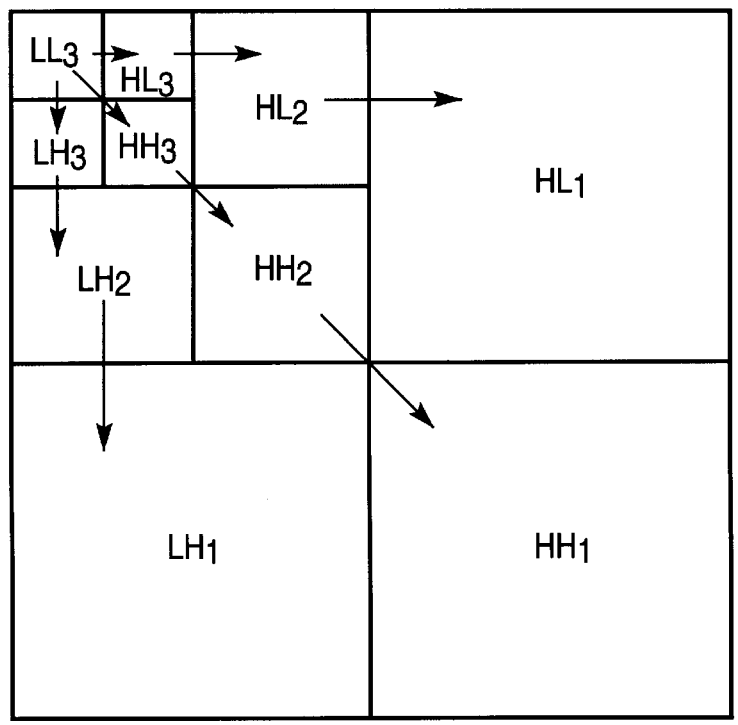
FIG. 10 illustrates a wavelet hierarchical subband decomposition.

For a wavelet hierarchical subband decomposition, the image is decomposed using times two sampling into high horizontal-high vertical (HH), high horizontal-low vertical (HL), low horizontal-high vertical (LH), and low horizontal-low vertical (LL), frequency subbands. The LL subband is then further subsampled times two to produce a set of HH, HL, LH and LL subbands. This is down sampled recursively to produce an array such as that illustrated in FIG. 10 where three subsamplings have been used. Preferably six subsamplings are used in practice. The parent-child dependencies are shown with the arrows pointing from the subband of the parent nodes to the subbands of the child nodes. The lowest frequency subband is the top left LL1, and the highest frequency subband is at the bottom right HH3. In this example, all child nodes have one parent.

Figure 11:
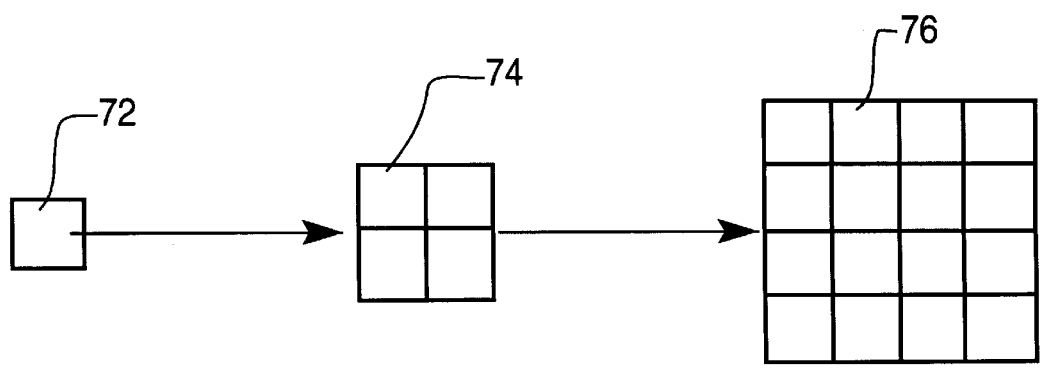
FIG. 11 illustrates the parent-child relationship for three generations of a subsampled image for a wavelet hierarchical subband decomposition.

In FIG. 11, the parent-child relationship for three generations of a subsampled image is illustrated. A single parent node 72 has four child nodes 74 corresponding to the same region in the image with times four subsampling. Each child node 74 has four corresponding next generation child nodes 76 with a further times four subsampling.

Figure 12:
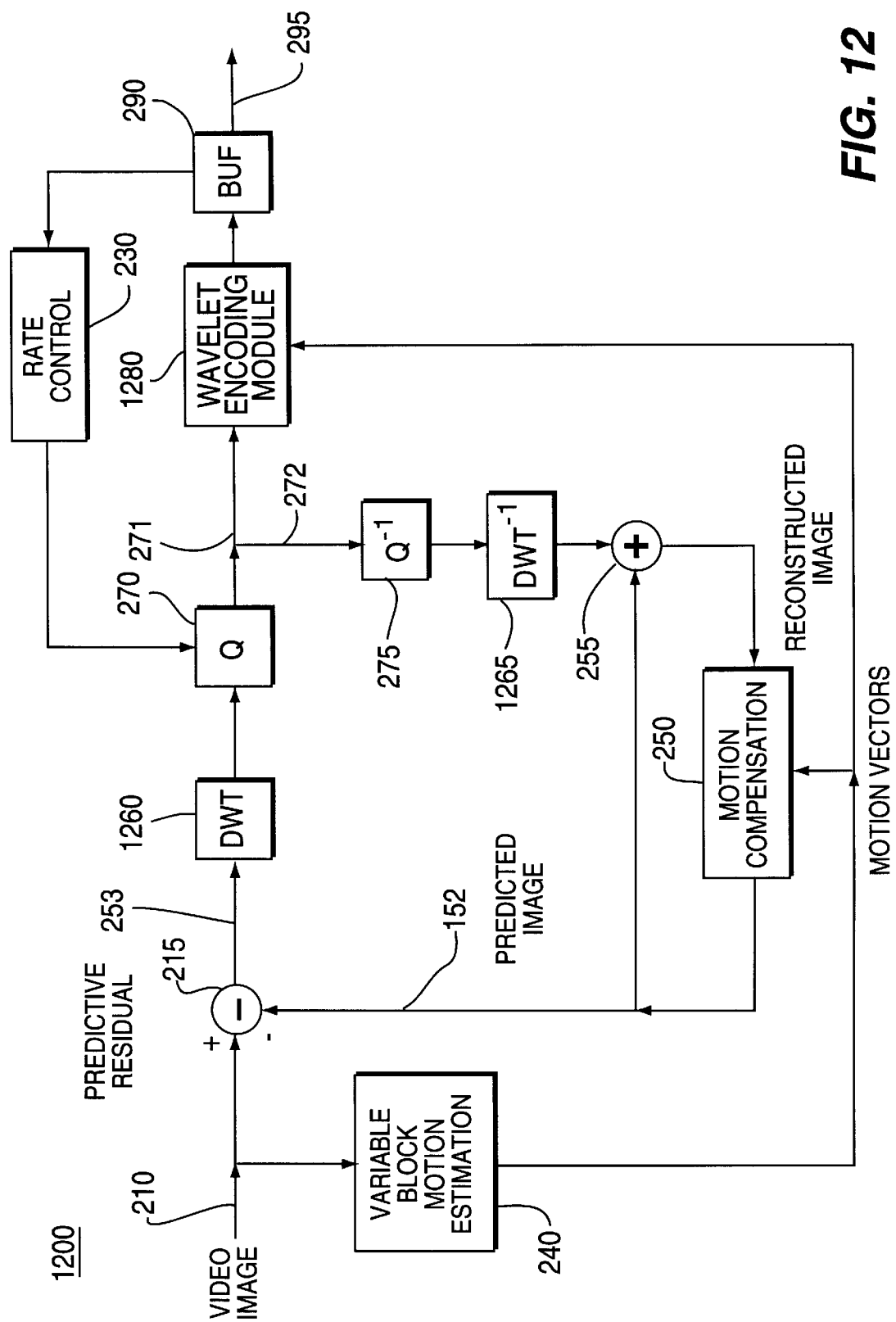
FIG. 12 illustrates a block diagram of the wavelet-based apparatus of the present invention.

FIG. 12 depicts a block diagram of the apparatus 1200 of the present invention for implementing the wavelet transform method, for reducing the computational overhead in determining motion vectors for quadtree-based variable block size motion estimation. In the preferred embodiment of the present invention, the apparatus 1200 is an encoder or a portion of a more complex variable block-based motion compensation coding system. The apparatus 1200 comprises essentially the same modules as disclosed in the apparatus 200 as shown in FIG. 2. The only difference is that the DCT module 260, inverse DCT module 265 and VLC module 280 are replaced by the DWT module 1260, inverse DWT module 1265 and wavelet encoding module 1280 respectively. The wavelet encoding module may incorporate any number of different encoding schemes such as zerotree coding and/or entropy encoding. The function of apparatus 1200 is similar to that of the apparatus 200 with the exception of applying wavelet transform on the input video image.

However, the wavelet-based method does not provide independence among the blocks. Thus, it is very difficult to compute the exact cost computation for each individual block.

Thus, the wavelet-based method uses a model for the distortion and to count only motion vector bits for the bit rate. The coding distortion is approximated by some constant times the prediction error MSE where the constant is empirically determined and the MSE is the mean squared error of the prediction residual, not the error between the original and decoded frame. If sufficient temporal correlation is assumed, then the Lagrangian multiplier can be approximated by the slope of the rate-distortion curve of the residual encoding of the previous frame.

A second wavelet-based approach is to compare only the total frame Lagrangian costs of a parent node and its children nodes. To compute this total cost, the block partition of the neighboring blocks is determined by the previous quadtree pruning results. The block partition of the regions where the pruning has not been applied is determined by the smallest block size (lowest level).

In a third embodiment, the variable quadtree structure of the present invention is employed in conjunction with the affine motion model to produce a variable block size affine motion model. The affine motion model is disclosed by J. Nieweglowski et al. in "A Novel Video Coding Scheme Based On Temporal Prediction Using Digital Image Warping", IEEE Trans. Consumer Electronics, Vol. 39, 3, pp. 141–150, August, 1993, which is incorporated herein by reference. The affine motion model constructs a prediction image or frame from a previous image by applying a geometric transformation known as "image warping". The transform specifies a spatial relationship between each point in the previous and prediction images.

Generally, motion compensation using block matching provides a good overall performance for translational motion. However, the block-matching motion estimation is a poor performer when motion contains rotational or scaling components (e.g., zooming or rotating an image).

In contrast, the affine motion model (affine transformation) is defined by six parameters ($a_1$ to $a_6$) and is expressed as:

$$[x, y, 1] = [u, v, 1] \begin{bmatrix} a_1 & a_4 & 0 \\ a_2 & a_5 & 0 \\ a_3 & a_6 & 1 \end{bmatrix} \quad (8)$$

where (x, y) are pixel coordinates in the previous frame and (u, v) are the coordinates of a given pixel in the prediction frame. A detailed discussion on determining the six parameters is presented in the J. Nieweglowski et al. reference. The affine relationship is characterized by the six parameters. Thus, the affine motion model is generally more effective in predicting motions such as translation, scaling, and rotation which are often observed not only in natural sequences, but also in synthetic scenes using digital effects.

In practice, affine motion models can be used either on a frame basis for global motion compensation or the affine motion models can be coupled with block-based motion compensation frameworks. The former approach has the advantage of requiring less overhead information, but it performs poorly in capturing local motions. An extreme case is when the affine motion model is built on a frame level as in global motion compensation.

Figure 13:
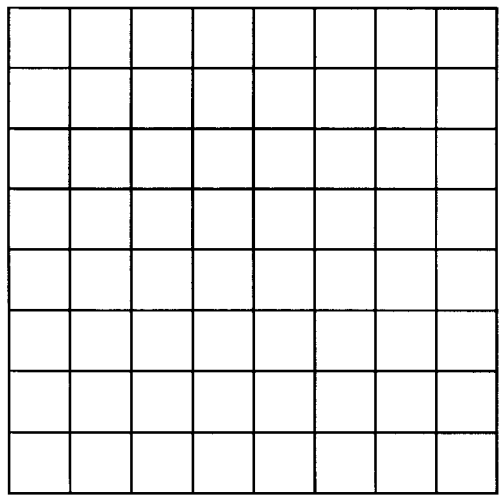
FIG. 13 illustrates a uniform block size structure.

Similarly, the later approach is well suited for local rotational, translational and scaling motions, but the relatively "fixed" block size constraint is somewhat restrictive. Namely, although the affine motion model incorporates "irregular block shape" (illustrated in FIG. 14) as compared to uniform patch block (e.g., a fully blossomed quadtree structure as illustrated in FIG. 13), the affine motion model is design to be implemented in existing coders. Thus, the number of "grid points" is chosen to be the same as the number of the conventional motion compensation blocks.

More specifically, a set of grid points are selected on a previous frame. The motion is then estimated by finding the best match for these grid points on a current frame. Alternately, the process can be reversed by selecting a set of grid points on a current frame and the motion is then estimated by finding the best match for these grid points on a previous frame.

The main issue in an affine motion model is the estimation of the affine parameters for a very small image block (e.g., 16×16 macroblock). An iterative gradient based approach might not converge if the initial point is not selected correctly. Various methods exist for computing the affine parameters. However, the pyramidal method as described by Tihao Chiang and Ya-Qin Zhang in "Stereoscopic Video Coding", Proc. International Symposium on Multimedia and Video Coding, New York, N.Y. October, 1995 which is incorporated herein by reference, can be used to find a good initial point in estimating the affine parameters.

Figure 14:
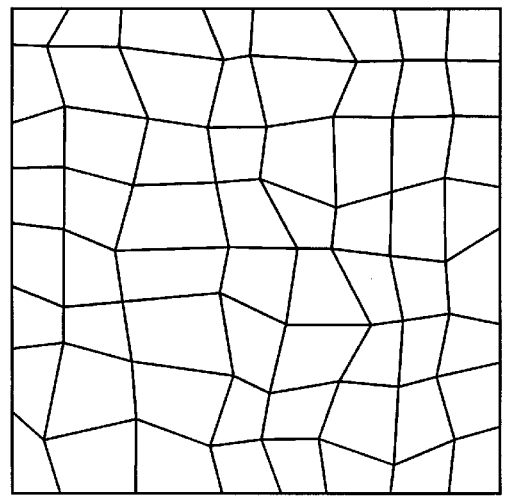
FIG. 14 illustrates an irregular block shape structure of an affine motion model.
Figure 15:
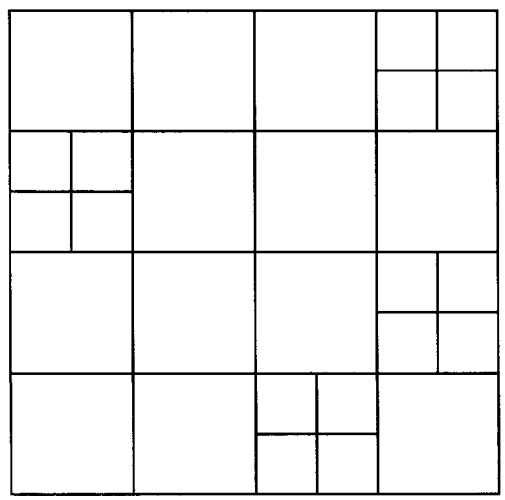
FIG. 15 illustrates a quadtree-structured motion compensation grid.
Figure 16:
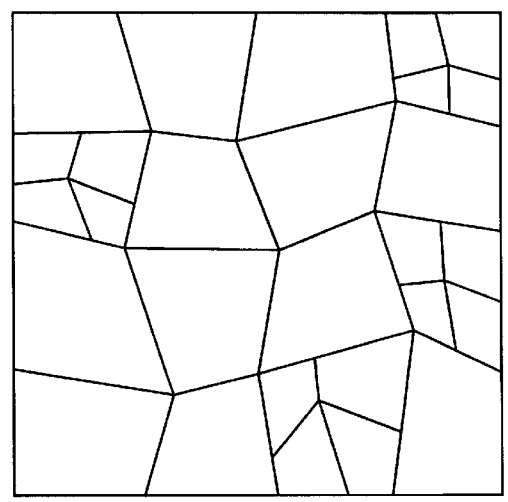
FIG. 16 illustrates a variable block size affine motion structure of FIG. 15.

Thus, the framework of the present quadtree based variable block size motion estimation (as illustrated in FIG. 15) is extended in similar fashion to produce a variable block size affine motion model (as illustrated in FIG. 16). Namely, it is assumed that the "affine" quadtree is fully blossomed, i.e., the entire picture is partitioned spatially down to the lowest level for every node as illustrated in FIG. 14. The motion vectors for the entire affine quadtree from the largest block-size to the smallest block-size are calculated. The method then optionally proceeds to optimize the quantization for each node as discussed above. The quantizer scale that produces the smallest distortion is selected.

Similarly, the method then compares from "bottom-up" (the lowest level to the highest level) the sum of the distortion from encoding all "affine" sub-blocks or subnodes (children) as compared to the distortion from encoding the block or node (parent) from which the subnodes are partitioned from. If the sum of the distortion from encoding the children is greater than that of the parent then the node is "merged". Conversely, if the sum of the distortion from encoding the children is less than that of the parent then the node is "split" and the Lagrangian cost for the parent node is set as the sum of the Lagrangian cost of its children. This step is repeated for the all nodes through every level until an optimal affine quadtree structure is obtained (e.g., as illustrated in FIG. 16).

The variable block size affine motion model is capable of achieving better prediction performance due to its ability to compensate for different shapes of image segment, thereby increasing its ability to efficiently code video object planes (VOPs) of the proposed MPEG 4 video (the formulation of the MPEG 4 standard is in progress).

There has thus been shown and described a novel apparatus and concomitant method for reducing the computational overhead in determining motion vectors for quadtree-based variable block size motion estimation. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method for determining a tree structure for performing variable block size motion estimation for an image frame, where said tree structure has a plurality of blocks organized in a plurality of levels with a parent-child relationship, said method comprising the steps of:

(a) partitioning the image frame into a plurality of blocks down to a lowest level of the tree structure;

(b) calculating a distortion for encoding each of said plurality of blocks, by selecting a quantizer scale that produces a minimum Lagrangian cost for each of said plurality of blocks;

(c) comparing a sum of said distortions for a set of children blocks with said distortion of a corresponding parent block; and (d) adjusting a size of said parent block in accordance with a result from said comparing step.

2. The method of claim 1, further comprising the step of:
   repeating steps (c) and (d) for all of said blocks up to a highest level of the tree structure.

3. The method of claim 1, wherein said adjusting step (d) comprises the steps of:
   merging said children blocks if said sum of said distortions for said children blocks is greater than said distortion of their parent block or splitting said parent block into its children blocks if said sum of said distortions for said children blocks is less than said distortion of their parent block.

4. The method of claim 3, wherein said adjusting step (d) further comprises the step of:
   setting said distortion of said parent block to said sum of said distortions for its children blocks if said sum of said distortions for said children blocks is less than said distortion of their parent block.

5. The method of claim 1, wherein said comparing step (c) and adjusting step (d) are conducted using a bottom-up search pattern.

6. Method for determining a tree structure for performing variable block size motion estimation for an image frame, where said tree structure has a plurality of blocks organized in a plurality of levels with a parent-child relationship, said method comprising the steps of:

(a) partitioning the image frame into a plurality of blocks down to a lowest level of the tree structure;

(b) calculating a distortion for encoding each of said plurality of blocks, by selecting a quantizer scale that produces a minimum Lagrangian cost for each of said plurality of blocks;

(c) comparing a sum of said distortions for a set of children blocks with said distortion of a corresponding parent block; and (d) adjusting a size of said parent block in accordance with a result from said comparing step,
   wherein said comparing step (c) and adjusting step (d) are conducted using a top-down search pattern, and wherein said distortion calculating step (b) only calculates a distortion for said plurality of blocks that are grown.

7. The method of claim 1, wherein said quantizer selecting step comprises the steps of:
   assigning each of said plurality of blocks a selected set of quantizer scales; and
   selecting a quantizer scale from said selected set of quantizer scales that produces a smallest amount of distortion for each block.

8. The method of claim 1, wherein said distortion calculating step (b) comprises the step of:
   computing a motion vector for each of said plurality of blocks, wherein said distortion for each block is a result of encoding each block using said motion vector.

9. The method of claim 8, wherein said selected quantizer scale for each of said plurality of blocks is selected to produce a minimum Lagrangian cost for each block.

10. The method of claim 9, wherein said distortion calculating step (b) is subjected to a total bit budget constraint predefined for the image frame.

11. Method for determining a tree structure for performing variable block size motion estimation for an image frame, where said tree structure has a plurality of blocks organized in a plurality of levels with a parent-child relationship, said method comprising the steps of:

(a) partitioning the image frame into a plurality of blocks down to a lowest level of the tree structure, wherein said plurality of blocks are affine blocks;

(b) calculating a distortion for encoding each of said plurality of blocks by selecting a quantizer scale that produces a minimum Lagrangian cost for each of said plurality of blocks;

(c) comparing a sum of said distortions for a set of children blocks with said distortion of a corresponding parent block; and (d) adjusting a size of said parent block in accordance with a result from said comparing step.

12. The method of claim 1, wherein said tree structure is a quadtree structure.

13. The method of claim 11, wherein the image frame comprises video object planes.

14. Apparatus for encoding an input image which is partitioned in accordance with a tree structure, where said tree structure has a plurality of blocks organized in a plurality of levels with a parent-child relationship, said apparatus comprising:
   a variable block motion estimation module for computing a plurality of motion vectors for all of said plurality of blocks for the entire tree structure of the input image to obtain an optimal tree structure;

a motion compensation module, coupled to said variable block motion estimation module, for generating a predicted image using said plurality of motion vectors for said optimal tree structure;

a transform module, coupled to said motion compensation module, for applying a transformation to a difference signal between the input image and said predicted image, where said transformation produces a plurality of coefficients;

a quantization module, coupled to said transform module, for quantizing said plurality of coefficients; and a rate control module, coupled to said quantization module, for selecting a quantizer scale that produces a minimum Lagrangian cost for each of said plurality of blocks.

15. The apparatus of claim 14, wherein said tree structure is adjusted by comparing a sum of said Lagrangian costs for a set of children blocks with said Lagrangian cost of a corresponding parent block.

16. The apparatus of claim 14, wherein said transform module applies a forward discrete cosine transform.

17. The apparatus of claim 14, wherein said transform module applies a wavelet transform.

* * * * *